Aug. 19, 1941.    P. A. FRIEDELL    2,253,231
SENSITOMETER, ACTINOMETER, AND PHOTOGRAPHIC
CHARACTERISTIC MEASURING SCALE
Filed July 17, 1940

Inventor
Philip A. Friedell

Patented Aug. 19, 1941

2,253,231

UNITED STATES PATENT OFFICE 2,253,231

SENSITOMETER, ACTINOMETER, AND PHOTOGRAPHIC CHARACTERISTIC MEASURING SCALE

Philip A. Friedell, Oakland, Calif.

Application July 17, 1940, Serial No. 346,045

15 Claims. (Cl. 95—10)

This invention, a photographic characteristic measuring scale, is an improvement over the scale disclosed in my copending application Serial No. 227,365, filed August 29, 1938, for Photographic scale and system of determination and measurement of characteristics of photographic elements, and this application is a continuation-in-part of said copending application.

This scale, similar to the one disclosed in the previously mentioned application, is made in the form of a negative, and comprises a combination of sensitometer, actinometer, photographic wedge and tonal range and mating ratio scale; and its products, the prints produced therefrom, may be used to function as densitometers; therefore, this scale including prints produced therefrom, is adapted to the measurement of all characteristics and effects of photographic materials and elements, including speeds, tonal ranges and mating ratios of photo-sensitive emulsion bearing materials, potentials of developers, densities, relative strengths of printing and enlarging illumination and of safe-lights, tonal ranges, mating ratios and exposure factors of negatives, light absorbing values of color transparencies, glass and other materials, and the actual effects of intensifiers and reducers; and it is also adapted to precision balancing of separation negatives; and it additionally provides for accurate plotting of characteristic curves of films and plates and of the neutral axes of photographic papers.

The objects of the invention are as follows:

First; to provide a scale through the medium of which by direct printing, speeds and other characteristics of photographic materials and elements may be accurately measured.

Second; to provide a scale as outlined in which factors are provided and which factors are based on the actinic component alone of the light transmitted through a negative and thereby distinguishing from opacities which are based on the total light transmitted, with the factor of air=1.00 as a base, and which factors function to establish relative speeds of emulsion bearing materials when the material is printed through the said scale.

Third; to provide a scale as outlined which will measure characteristics as previously mentioned, in terms of concrete values, and which scale is calibrated in terms of total actinic light absorbing values, including opacities and the light absorption values of the emulsion base such as the Celluloid or glass support and gelatine, and any dye or stain carried by the base and the silver deposit forming the opacities.

In describing the invention, reference will be made to the accompanying drawing, in which.

Figure 1:
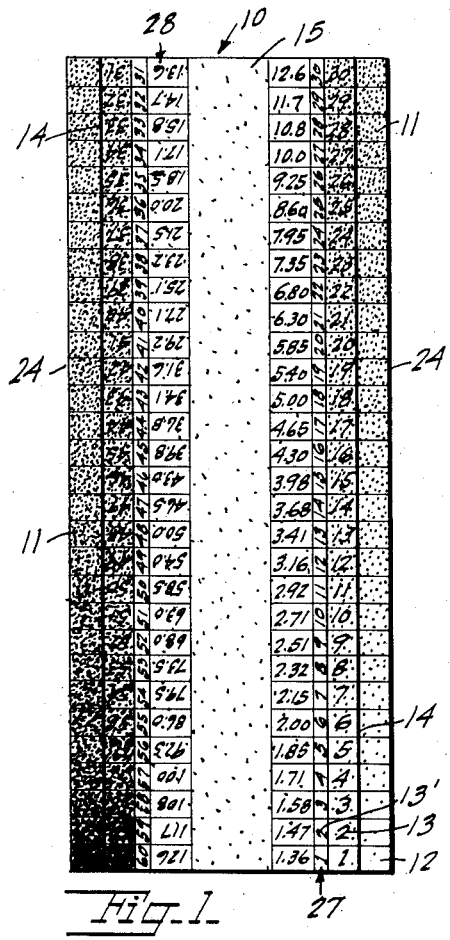
Fig. 1 is a plan view of the invention.

This scale can be used for producing the tone scales for the scale disclosed in my Patent No. 2,207,375, issued July 9, 1940, and consists of step wedge consisting of a directly adjoining negative 10 which includes a series of areas or steps 11 which vary logarithmically in density from one end of the series to the other.

These areas are formed in continuous series with one end of the areas all terminating in line so that a print produced from the negative may be straight trimmed to provide a common abutting edge for all of the tones produced in the print, for abutting matching with the key tone scale of Fig. 2, to be later described. This key tone scale establishes a standard or base for speed, tonal range and mating ratio and other determinations and measurements.

Starting at the end of the series with the step of least density indicated at 12, each area has an opaque numeral 13 applied, for non-printability, thus appearing white in prints and transparent in films and plates, even following prolonged exposure, and may consist of numbers produced by excessive exposure or with opaque ink, or of thin metal or other opaque material fixed thereon. These numerals are herein termed tonal range evaluators or tone identifying numbers, because they are the values which establish in terms of concrete values, definite densities and tones as also the tonal ranges of emulsions and negatives. These tonal range evaluators are evaluated on the basis of the number of included log increments starting with the area of least density to which unit value is assigned, the log increment being of a predetermined value, so that with a scale formed with log increments of one-half the predetermined value, the serial numbers would increase by halves, and with doubled increments, the series would increase by twos. Thus uniformity in tonal range and mating ratio determinations would be maintained irrespective of the log increments used in forming the scale. The scale illustrated shows values based on a preferred log increment of .0333.

These tonal range evaluators also function as practical-threshold-speed indicators, for establishing the minimum exposure which will produce visually-recognizable detail with the emulsion under test.

An opaque line 14 which may be formed by any of the methods outlined for producing the tonal range evaluators for non-printability, extends throughout the entire series of areas and forms the absolute-threshold-speed indicator, and when the negative is printed, this indicator appears white on papers and transparent on films and plates, and it functions to establish the absolute threshold speed of emulsions by the area of the print in which it is no further detectable by contrast with the surrounding area. It establishes the minimum exposure which will produce the initial effect of measurable value on the emulsion under test.

In addition to the series of areas 11, there is also a combined uniformity-of-development-indicating, name, and scale plate 15 which is preferably uniform in density throughout and preferably having a density below 1.00 or actinometric factor 10.0 so as to print to a neutral to fairly deep tone when area "1" of a print has been printed full black through the scale.

This plate being of comparatively broad expanse and uniform in density throughout, will visually indicate any non-uniformity of development in prints made therefrom, on paper, film or plate, by mottling or streaking which is clearly distinguishable but which mottling or streaking is usually unnoticeable in ordinary photographic prints and negatives except where broad expanses such as the sky is concerned. This mottling or streaking, or unevenness in tone or density, is generally caused by too short a duration of development, old developer, or incorrect agitation, and this plate functions as an indicator so that such faults in processing may be corrected. The size, form and contrast of the unevenly developed areas and the direction of the streaks indicate the cause.

In view of the fact that the tone-identifying numbers will be unreadable in the threshold portion of the prints made from this scale, a second series of tone-identifying numbers or tonal range evaluators 13', identical to the first mentioned series, is provided on the uniformity of development indicating plate, with the respective numbers in registry with the respective like numbered areas, and these numbers of the second series will print with equal clarity throughout and will always be readable for identifying the number of any area, density or tone.

Also provided on the plate in registry with the respective areas are the actinometric factors of the respective areas based on a value of 1.00 for air and determined and established by the respective exposures required to produce identical tones through the respective densities, using predetermined standard materials and system of processing. A transmission densitometer is not practical for determining and establishing the values of these densities, since a transmission densitometer, of either the comparison type or photometric type, provides measurements and values based on all of the light transmitted instead of on the actinic component alone of the light transmitted through the negative. The printing method establishes the true actinometric value of each area, because only such light which is transmitted through the negative which actually effects the emulsion, is registered. Thus the factor (density evaluation) of section "1" can never be as low as 1.00 while a transmission desitometer might readily register a value of 1.00 (log .00). A value of about 1.27 is about the minimum attainable. These actinometric factors are indicated at 28.

The plate is illustrated as being located in the center between the two portions of the wedge; however, the wedge can be made in one continuous series of areas or in any other practical arrangement. The arrangement shown is nevertheless deemed to be the most practical and desirable because it can be printed on a comparatively small sheet of sensitized material. In the size illustrated, a speed test and a tonal range and mating ratio test can both be made on a single sheet of sensitized paper 5 x 7 inches in size.

The majority of photographic papers have characteristic curves which may differ up to a certain point on the shoulder which obviously is the deeply printed end of the scale, and from that point to initial black the change in tone is about equal irrespective of the relative contrast of the paper. This point was found by experiment and measurement to be approximately the fourth step above initial black when measured with increments equal to the sixtieth root of $100 = 1.0798$, log .0333. However, there are some papers in which the depth of tone of this critical point can never be attained, and for which suitable provision has been made.

Obviously the value of a tone can never be measured after it has reached its deepest stage, and any tone is difficult to measure accurately below this critical point or depth of tone, and since accuracy in speed determinations can never be attained without a base or key tone establishing this critical tone or point, it is essential that that base or key tone shall form a part of the invention, and that sufficient additional tones be supplied in conjunction with the key tone to compensate for the lack of depth of tone in papers which cannot be made to attain the critical tone. The scale of the previously mentioned patent can be used for the same purpose.

Figure 2:
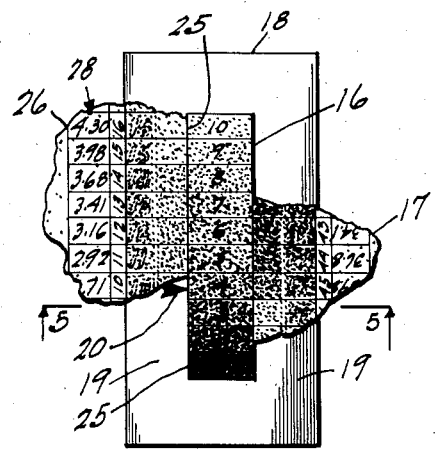
Fig. 2 is a plan view of the speed balancing or key tone scale which forms a part of the invention, and illustrating the method of use.

A scale including this base or key tone is illustrated in Fig. 2, and which consists of a photographic wedge print 16 which is printed on a very "soft" grade of sensitized paper with the edges of the steps terminating in line to form an abutting edge for abutting and planar coordination with a print 17 to be matched. This wedge print is mounted on a suitable support 18 of greater width to form ledges 19 to support the print 17 with its surface in the same plane as that of the print 16, and the tones of this scale range from black infinity in step 1 to a neutral grey for the highest numbered step, and the increments are the same as those of the negative scale.

The previously mentioned critical tone is indicated by a suitable identifying marker or indicator 20, and the steps are serially numbered.

The system of measurement of characteristics will now be explained in connection with contact, otherwise known as chloride papers.

The first step is the measurement of the photoactinic light absorbing value or exposure factor of the printing frame glass. A standard light and standard processing materials are used. A sheet of paper 21 is laid on a flat surface 22, and on top of this paper is laid the printing frame glass 23 with the paper protruding from under the glass as shown. An exposure is given which will produce a tone on the projecting portion of the paper not deeper than the critical tone, and the print produced is then measured by means of the scale of the previously mentioned patent or by a scale print made on the same paper through the negative scale of this application, dividing the factor of the tone which matches the glass printed tone by that of the direct through air printed tone, thus establishing the exposure factor of the glass.

Each of the contact or chloride papers to be measured is exposed through the negative scale of this invention and processed by standard means. Tank development is recommended since time, temperature and agitation can be more accurately controlled. All contact papers now on the market can be given exposures each of 400 fcs, thereby obviating guessing and standardizing the exposure. The dried prints are trimmed just inside the edges 24 so that the tones of the print will extend to the trimmed edge to form an abuttable matching edge 25, 25.

Each print 17 is then abutted against the abutting edge of the key tone scale, Fig. 2, and adjusted along the scale until one of its tones matches the base or key tone. The exposure given the print is divided by the factor of the tone matching the key tone and by the factor of the glass, the result being the relative speed or exposure factor of the paper.

As illustrated in Fig. 2, step "45" matches the key tone, (step 4 on the key tone scale) and the factor of this tone is 39.8. The factor of the glass 23 will be assumed with a value of 1.23, and the exposure given the print as 400 fcs. The relative speed, or the exposure factor of the paper for the key tone or critical black, is therefore $$\frac{400}{39.8 \times 1.23} = 8.15 \text{ fcs}$$

For black infinity it is merely necessary to multiply the value 8.15 by the relative factor of step 4 of the print, and which factor is equal to 1.71/1.36=1.26, so that for black infinity or base, the exposure factor of this paper will be $$8.15 \times 1.26 = 10.25 \text{ fcs}$$

This last value could not be determined by direct measurement, since it cannot be known whether a full black tone has just reached or has exceeded its initial black stage.

There are some papers which never reach the depth of the base or key tone. When such papers are encountered, the print 26 is adjusted until a tone on the print matches a tone on the key tone scale, such as step 14 of the print machine step 8 on the key tone scale. The factor for the step registering with step 4 on the key tone scale is then used in establishing the exposure factor of the paper.

In the illustration, although step 14 matches step 8 of the key tone scale, the exposure factor of the paper is based on step 10 of the print with its factor of 2.71. Thus uniformity is assured in printing from various papers. In this type of measurement, the print 26 should be adjusted only so long as its tones are deeper than, or at least as deep as the registering tones of the key tone scale, which is the reason for using a very soft paper for forming the key tone scale.

To measure the tonal range and mating ratio of the paper, if the high value end of the print is white, the same print can be used, otherwise it will be necessary to make another print for tonal range and mating ratio measurements.

For the new print the exposure must be at least equal to, and for direct readings must be exactly equal to the exposure factor of the paper multiplied by the factor of step 1 of the negative and by the factor of the printing frame glass. The exposure factor of the paper on which print 26 was produced is equal to:

$$\frac{400}{2.71 \times 1.23} = 120 \text{ fcs}$$

and the exposure therefore must be not less than, and preferably exactly equal to:

$120 \times 1.36 \times 1.23 = 201$ fcs, for the practical range, and for total range;

$120 \times 1.36 \times 1.23 \times 1.26 = 253$ fcs, which will produce the initial stage of absolute black in step 1.

Figure 3:
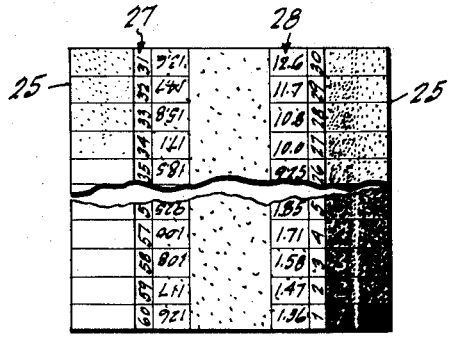
Fig. 3 is a broken view showing the method of measuring tonal ranges and mating ratios of photographic papers.
Figure 4:
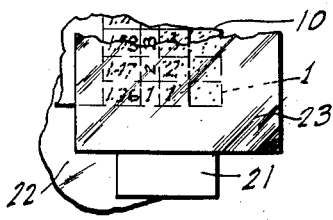
Fig. 4 is a fragmentary view illustrating the method of measuring the exposure factor of glass, film base, and other materials.

The tonal range and mating ratio measuring print is illustrated in Fig. 3. It will be noted that the highest number which is readable is "29" and this number establishes the practical tonal range, which is termed practical since visually recognizable detail in prints cannot be produced in a higher key due to lack of contrast. If the critical black stage has been produced in some step other than step "1", the number of the step, minus 1, is subtracted from the highest readable number.

The practical mating ratio is determined as follows: The factor of step 29 is 11.7 and the factor of step 1 is 1.36, and the mating ratio is therefore equal to 11.7/1.36=8.6. This paper is therefore capable of covering, and exactly matches a negative which has a tonal range of 29 or a mating ratio of 8.6, (maximum factor divided by minimum factor). The tonal range is also equal to 30 (max. density minus min. density) plus 1.

In many cases the absolute threshold speed, tonal range and mating ratio values of emulsions are desired. For this reason the second series 27 of tone identifying numbers is provided as is also the threshold indicator line 14. In Fig. 3, the indicator line vanishes in step "34" which number cannot be identified in the tone due to lack of contrast but will be found on the plate in registry with this particular area, and which establishes the absolute limit of printability with an absolute tonal range of 34+4=38, (initial absolute black to initial absolute white) and an absolute mating ratio of $$\frac{17.1 \times 1.26}{1.36} = 15.8$$

The same procedure is used for measuring bromide and bromo-chloride papers with the exception that the exposures are made equal to about one percent of those for chloride papers, in other words, an exposure of about four foot-candle-seconds would provide a universal exposure value for enlarging papers.

For films and plates the process is very similar with the exception that the exposures are reduced to about .01 percent of that for chloride papers, or about .04 fcs., and the speed is based on the practical threshold step, such as step "29" of Fig. 3, and the established value may be multiplied by 75, which is the absolute limit of practical coverage of photographic papers.

Figure 5:
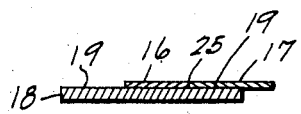
Fig. 5 is a section taken on line 5—5 of Fig. 2.

Color-blind films require no compensation, but orthochromatic and panchromatic films may require such compensation and may be determined and established by printing the film or plate as illustrated in Fig. 5, processing, and measuring the actinometric factors by means previously described.

For this type of test a strip of the film or plate is laid on the flat support, the negative scale is laid with its step "1" over the paper, and the glass is laid on top of the scale with the film or plate projecting from under the glass, the scale being indicated at 1. The film or plate is exposed and processed and then measured. This print will establish the compensating factors for both, the glass and the negative scale.

For determining the relative strength of two lights, such as printing lamps, safe-lights and enlarger beam, two prints are made through the scale, one by each source of illumination, giving the same duration of exposure, and the two prints are processed identically. The factors of matching steps of the prints divided one by the other, establishes the relative strengths of the lights at the specific distances. If different durations of exposures are given to the prints, their values must be included in the calculations.

To determine the effect of any change in the materials or in the system of processing, two prints are made through the scale, one of which is produced with standard materials and system of processing, and the other of which includes the change from standards, and measurements are made in the manner previously described for other tests.

The method of making other tests and measurements will be apparent from those previously described. The tonal range and mating ratio measuring prints may be used for plotting characteristic curves of plates and films and the neutral axes of papers; however, for plotting the characteristic curves of plates and films it is advisable to produce a print in which the threshold indicator vanishes in the highest numbered area.

I claim:

1. A photographic characteristic measuring scale comprising a negative having a continuous series of areas of logarithmically increasing densities based solely on the actinic component of light transmitted, with each area directly abutting the next adjacent area, and having the respective areas serially numbered with the numbers applied to the respective areas in the form of an opaque medium for non-printability when said negative is printed on a photo-sensitive emulsion-bearing medium to identify through a low degree of contrast with the surrounding area by means of the highest readable number the practical threshold area for establishing the speed and for establishing the practical limit of tonal range of said emulsion; and having a continuous opaque indicator extending throughout the entire series of areas and bounded on both sides by the opacity of each area for non-printability to identify through entire lack of contrast with the surrounding area in which the indicator vanishes in the print, the absolute threshold area for establishing the absolute threshold speed and for establishing the absolute limit of tonal range of said emulsion; and factors assigned to the respective areas and based on the relative values of said densities and constituting actinometric factors and divisors for establishing the respective exposure factors or basic exposure requirements of emulsions by the quotient of the exposure given the print divided by the factor assigned to the specific area on which the speed is based.

2. The method of measuring the relative speeds, tonal range and mating ratio of a photographic paper consisting in exposing a photographic paper through a photographic wedge and coincidently maintaining predetermined numeral shaped areas in each step against exposure to form serial numbers in series in the steps through contrast with the surrounding exposed portion and processing the same under standard conditions to produce a print; trimming the print to terminate all tones along a common line to form a continuous abuttable edge and matching the tones of the print produced with a print tone of predetermined depth to determine the step of the wedge which produced a tone identical to that of said print tone; dividing the exposure given said print by the actinometric factor based on the actinic component alone of the light transmitted, of the step of the wedge which produced said tone identical, for establishing the relative printing exposure requirements of said photographic paper; dividing the exposure given said print by the actinometric factor of the step in which the serial number is last identifiable by contrast with the surrounding area of the step, to establish the threshold speed; deducting the serial number which produced said tone identical from the said serial number which is last identifiable and adding 1, to establish the tonal range of said paper; and dividing the actinometric factor of the step in which the serial number is last identifiable, by the actinometric factor of the step which produced said tone identical, to establish the mating ratio of said paper.

3. A scale for measuring the characteristics and effects of photographic materials and elements comprising a negative having a continuous series of areas varying geometrically in density with a ratio of progression less than $\sqrt{1.25}$, and with the respective areas serially numbered with the numbers existing in the form of an opaque medium with each number completely enclosed within the confines of its area for substantially complete light obstruction to identify in a print produced on a photo-sensitive material from said negative, through low contrast with the surrounding area, the upper limit of practical-tonal range and to establish the relative practical-threshold speed of the photo-sensitive material; and factors assigned to the respective areas and based on relative exposures required to produce identical effects in a photo-sensitive material and measured in terms of the actinic component alone of light transmitted through the respective areas.

4. A structure as defined in claim 3, a plate of uniform, substantially low density extending along one side of said series of steps; said factors being applied to said plate in registry with the respective areas to which they are assigned to provide directly readable factors on the print produced from said negative irrespective of the depth of printing, and functioning as divisors for establishing the basic exposure requirements of the photo-sensitive materials from which a print is produced from said negative, through dividing the exposure given the print by the factor of the area through which a predetermined tone has been produced in the print under standard processing conditions.

5. A photographic characteristic measuring scale comprising a negative including a step wedge in the form of a continuous series of sections varying in density measured in terms of solely the actinic component of light transmitted throughout the series with a ratio of progression equal to the sixtieth root of 100, and with factors assigned to the respective sections and based on the relative values of said densities.

6. A structure as defined in claim 5 in which said sections are serially numbered on the basis of increments of the sixtieth root of 100 and which numbers exist in the form of opaque numerals applied within the confines of the respective sections to prevent exposure of said photo-sensitive emulsion through the areas occupied by the numerals, for identification through a low degree of contrast with the surrounding area of the threshold section on a print produced from said negative and identified by the highest number which is readable on the least exposed sections of the print.

7. The method of determining the basic exposure requirements of a photographic emulsion, consisting in exposing the emulsion through a step wedge and processing under standard conditions to form a print, trimming the print produced to form an edge in which all tones terminate, abutting the respective tone steps of the print with a print tone of predetermined depth while maintaining both in the same plane to determine the step of the wedge through which a tone identical to that of said print tone was produced, and dividing the exposure given the print by the actinometric factor, based on measurements in terms of the actinic component alone of the light transmitted, of the step which produced said tone identical.

8. The method of measuring the exposure and mating characteristics of a photographic paper consisting in printing the paper through a step wedge while coincidently maintaining predetermined numeral shaped areas in each step against exposure to form a serial number in each step on the print for identification of the respective steps, and identifiable only through contrast of the white numeral shaped area with the exposed surrounding area of any step, and processing the exposed paper under standard conditions to form a print, trimming the print produced to form an abuttable edge in which all tone steps terminate, abutting the respective tone steps of the print with a print tone of predetermined depth to determine the step of the wedge which produced a tone identical to that of said print tone, dividing the exposure given said print by the actinometric factor, based on the actinic component alone of light transmitted, of the step which produced said tone identical for establishing the exposure factor or basic exposure requirements of the paper; dividing the actinometric factor of the step on the print identified through the highest serial number which is readable through a minimum of contrast with the surrounding tone, by the actinometric factor of the step in which said tone identical is produced, for establishing the mating ratio of the paper; and subtracting the serial number of the step having said tone identical, from said highest number and adding 1 for establishing the tonal range of the paper, substantially as described.

9. A combined sensitometer, actinometer, and characteristic measuring scale comprising; a support; a photographic wedge formed on said support and consisting of a continuous series of adjoining areas of increasing opacities with increments not in excess of 1.12, said opacities including both, the light controlling and light changing characteristics of the respective areas and of the support and therefore being based solely on the actinic component of light transmitted through the areas and with the values of said opacities applied to the areas and functioning as actinometric factors for determining the relative values of characteristics of an emulsion printed through said scale.

10. A structure as defined in claim 9; said areas being serially numbered with the numerals applied to and within the confines of each area in the form of an opaque medium for non-printability while the remainder of the area is subject to printing, to indicate through lack of contrast and therefore non-readability of a serial number on a print produced through said scale, the threshold step to determine through the medium of the exposure given the print and the actinometric factor of the threshold step, the threshold exposure requirements of the emulsion on which the print is made.

11. A combined sensitometer, actinometer, and characteristic measuring scale comprising; a rectangular support; a photographic wedge formed along each side portion of said support and consisting each of a series of rectangular adjoining areas all terminating adjacent the respective edges of the support, and with the areas increasing in opacity throughout each wedge and continuing from one wedge to the other, and with the opacities measured in terms of the actinic component alone of light transmitted through the respective areas and including that of the support, and with the values of said opacities applied to the areas, said areas being serially numbered throughout with the numerals applied in the form of an opaque medium for non-printability and with the numerals of each serial number being located entirely within the confines of its area to indicate, through lack of contrast with the surrounding area in a print produced through said scale, the threshold exposure area, for establishing the threshold speed of the emulsion on which the print was produced.

12. A structure as defined in claim 11; said wedges being spaced to provide an intervening portion on said support; said actinometric factors being printably applied to said intervening portion in registry with the respective areas for printability on a photographic emulsion bearing material irrespective of the degree of printing through the areas; and a duplicate of each serial number applied printably to said intervening portion in registry with its area, for identification of areas in which said numerals are unreadable in the least exposed areas in the print.

13. A structure as defined in claim 11; a continuous opaque indicator applied to each wedge and continuing throughout the entire series of areas of each wedge and bounded on both sides by the specific areas to increase the visual contrast for clear identification of the area in which the unexposed line produced thereby on a print produced through said scale vanishes, for establishing the absolute threshold characteristic of the emulsion on which the print was made, said indicator being located remote from the edge of the support to maintain the line produced after the print is trimmed.

14. A combined sensitometer and actinometer comprising; a relatively transparent support rectangular in form; a photographic wedge divided intermediate its length forming two portions of which one is a continuation of the other, with the respective portions formed along the respective side portions of the support and spaced apart to provide an intervening portion on the support; said respective portions each consisting of a continuous series of areas terminating in a trimming line adjacent the edge of the support, and with the areas increasing in opacity with increments of not to exceed 1.12 and with the opacities including the light controlling and light changing characteristics of the areas and of the support and based in value solely on the actinic component of light transmitted through any area, and with the values of said opacities printably applied on said intervening portion; said areas being serially numbered with opaque numerals applied within the confines of each area for non-printability for identification of the threshold step in a print through lack of contrast with the unprinted area of the numerals; and identical serial numbers printably applied in registry with their respective areas on the intervening portion for identification of the serial numbers of areas the serial numbers of which are unreadable in the print due to lack of contrast.

15. A combined sensitometer and actinometer comprising; a relatively transparent support rectangular in form; a photographic wedge formed along one side portion of said support and consisting of a series of rectangular areas all terminating at one end adjacent the side edge of said support; said areas being in continuous series with the adjacent areas adjoining, and with the areas increasing in opacity with increments not in excess of 1.12, and with the opacities including both, the light controlling and light changing characteristics of the areas and of the support and based in value solely on the actinic component of light transmitted through the area, and with the values of said opacities printably applied on the other side portion of said support; said areas being serially numbered with opaque numerals applied entirely within the confines of each area for non-printability to identify the threshold step in a print produced through said wedge, by lack of contrast between the surrounding area and the unexposed area protected by the numeral; and identical serial numbers applied in registry with the respective areas on the other side portion of said support for identification of the serial numbers of the areas the serial numbers of which are unreadable in the print due to lack of contrast with the surrounding areas.

PHILIP A. FRIEDELL.